Oct. 14, 1924.　　　　　　　　　　　　　　　1,511,811
B. HASKELL
BRAKE BEAM SUPPORT
Filed March 14, 1923
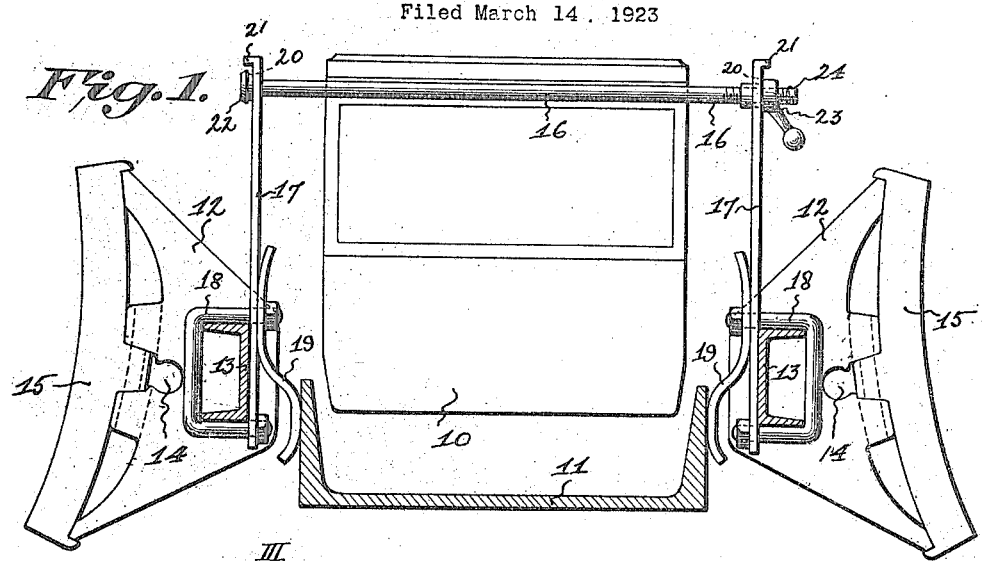
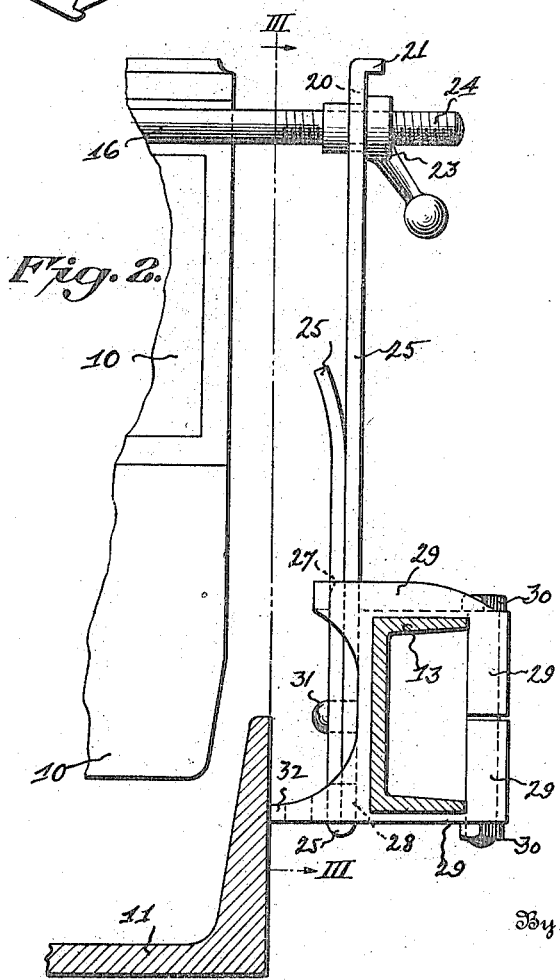
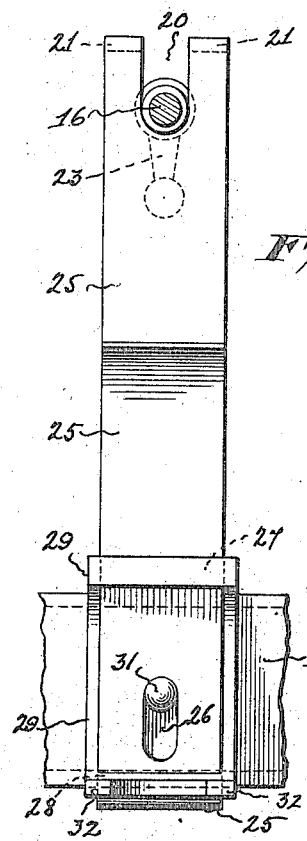
Inventor
Broderick Haskell
By
Attorney Patented Oct. 14, 1924.

1,511,811

UNITED STATES PATENT OFFICE.

BRODERICK HASKELL, OF FRANKLIN, PENNSYLVANIA.

BRAKE-BEAM SUPPORT.

Application filed March 14, 1923. Serial No. 624,942.

*To all whom it may concern:*

Be it known that I, BRODERICK HASKELL, a citizen of the United States, residing at Franklin, in the county of Venango and State of Pennsylvania, have invented certain new and useful Improvements in Brake-Beam Supports, of which the following is a specification.

This invention relates to brakes for railway cars, and more particularly to a device adapted to balance or hold a brake beam in proper alinement with respect to the wheels and release the brake shoes carried by the beam from said wheels when the brakes are released.

The objects of the invention are:—

First, to so construct and arrange an arm with cooperating parts which consist of a minimum number of inexpensive parts capable of being easily and quickly applied to truck frame and brake beam and adapted to adjust and balance the brake beam in correct alinement so as to efficiently apply the brake shoes to the wheels under all conditions of service.

Second, to so construct and arrange the parts of a device of the character above indicated so that the same not only are capable of properly alining and adjusting the brake beam, but also adapted to quickly and uniformly release the brake shoes from the wheels when the brakes are released.

Third, to construct and arrange a combined brake beam balancing arm and brake shoe release which can be applied to all existing forms of truck frames without special tools or skilled labor in a minimum of time and without disturbing or removing the brake beams or connected brake applying gear.

Fourth, other advantages and objects of the invention will appear from the detailed description of the construction, arrangement, manner of applying and operation of the parts which will be hereinafter more fully disclosed.

The invention consists of structurel characteristics and relative arrangement of elements which will be presently more fully described and particularly pointed out in the appended claims.

In the drawings in which similar reference characters indicate the same parts in the several figures:

Figure 1 is a fragmentary side elevation partly in section of the brake mechanism embodying the invention.

Figure 2 is an enlarged fragmentary side elevation of a section of the brake mechanism of a modified form of the invention.

Figure 3 is a section on line III—III of Figure 2.

Referring to Figure 1 of the drawings 10 represents the end view of the usual truck bolster supported by the usual springs, not shown, from the spring plank 11.

12, 12 are the brake heads secured at the ends of the compression members 13 of the brake beams on each side of said bolster 10 and spring plank 11, and each of said brake heads 12, 12, is provided with the usual brake hanger seat 14 adapted to receive a brake hanger, not shown, and shoe 15 as is common in this class of inventions and need no further disclosure.

A horizontal tie rod 16 is arranged and disposed transversely to and preferably above and free of the upper section of the truck bolster 10, and between the bearing portion of and an end of said truck bolster 10. 17, 17, are vertical bars or rods preferably of spring steel, having their lower ends rigidly attached or clamped to the center sections of the compression members 13, 13 of the brake beam preferably by means of removable and encircling U-shaped clamps 18, 18 as shown. 19, 19 are slightly yielding stops attached by means of said clamps 18, 18 to the compression members 13, 13 and lower ends of the vertical rods 17, 17 and are interposed between said compression members 13, 13 and the spring plank 11, said stops being adapted and are for the purpose of preventing excessive movement of the compression member 13 or the brake beam towards the spring plank 11, as will be readily understood.

The upper ends of the vertical bar or rods 17, 17 are slotted at 20 to receive and support the outer sections or ends of the horizontal tie rod 16, which is free of the bolster 10, and the ends of said rods 17, 17 are turned outwardly slightly to form short lips or projections 21, 21, as shown for example on an enlarged scale in the upper end of Figure 3, said lips 21, 21 preventing the tie rod 16 from freeing itself or be displaced from the upper ends of said rods 17, 17 due to an enlarged head 22 at one end and a winged nut 23 on the other and threaded end 24 of said tie rod 16 abutting against said lips 21, 21 during any excessive movement towards the upper and outer ends of said rods 17, 17, as will be fully understood. By adjusting the nut 23 along the threaded section 24 of the rod 16, the proper alinement of the brake beams can be quickly and easily accomplished and thereby prevent the tilting of said brake beams on the brake hanger seats 14, 14, acting as fulcrums.

The modification shown in Figures 2 and 3 are substantially the same in construction and operation as that disclosed with respect to Figure 1, except that the lower end of the vertical rod 25 is bent back on itself, and is provided with an elongated slot 26 and is so constructed and arranged to pass through an upper strap opening 27 and lower strap opening 28 formed in a split casting 29 encircling the compression member 13 and securely and immovably clamped to said member 13 by a clamping bolt 30. Said casting 29 is also provided on the side adjacent to the spring plank 11 with a pin or projection 31 passing into and registering with the slot 26 and registering with the slot of the rod 25. A lateral extension 32 is preferably formed integral with the casting 29 at its lower edge adjacent to the strap opening 28 and is so arranged to abut against the spring plank 11 and act as a check and perform functions similar to the yielding stops 19, shown and described with reference to Figure 1 and needs no further disclosure.

The insertion of the vertical rod 25 into the strap openings 27 and 28 with its slot 26 in engagement with the pin or projection 31 of the casting 29, as shown in Figures 2 and 3, is effected by passing the upturned end of said rod 25 into and through the upper strap opening 27 and then tipped to the side until its lower end or edge is free of the pin 31, and then continue to pass said rod 25 through the upper strap opening 27 until the lower edge of the slot 26 registers with the lowest portion of the pin 31, when said rod 25 is returned to its vertical or upright position, which will then permit the lower end of the rod 25 to be inserted or dropped into the lower strap opening 28 until the upper edge of slot 26 abuts against the upper portion of the pin 31 and thereby removably connect the rod 25 to the casting 29, and at the same time permit the rod or bar 25 to be easily detached if so desired without being required to remove any nuts or uncoupling any other elements, as will be readily understood.

The parts being arranged as shown in Figure 1, the manner of effecting the proper alinement and balancing of the brake beams is by adjusting the winged nut 23 to the right or left on the threaded section 24 of the tie rod 16 until the brake beams with its brake shoes 15 assume the proper relation and balance with respect to the truck wheels either in the active or inactive positions, and will quickly and uniformly respond to the brake gearing when the air is applied to the air brake cylinders under all conditions of service.

From the foregoing disclosure of the construction, arrangement and manner of assembling and operation of the device, it will be seen that the tie rod 16 cannot only be easily applied to the truck frame but the vertical rods or bars 17 and 25 can also be easily detached from the tie rod 16 and brake beams without in any way disturbing the other elements comprising the brake device and manifestly all of the objects and advantages recited in the statement of invention have been fully and efficiently carried out, and while I have shown the preferred forms or modifications of carrying out the invention many other and similar expedients will readily suggest themselves without in any way departing from the present invention.

What I claim is:—

1. A car truck comprising a truck bolster, a combined balancing and alinement tie rod arranged above and transversely of said truck bolster, a brake beam provided with brake shoes and arranged on each side of the truck bolster, an upright rod on each side of said bolster and secured at its lower end to a brake beam and abutting at its upper end against an outer end of said combined balancing and alinement tie rod.

2. A car truck comprising a spring plank, a truck bolster above said spring plank, a combined balancing and alinement tie rod arranged above and transversely of said truck bolster, a brake beam provided with brake shoes and arranged on each side of the truck bolster, an upright rod on each side of said bolster and secured at its lower end to a brake beam and abutting at its upper end against an outer end of said combined balancing and alinement tie rod, and means for adjusting the distance between the upper ends or points of abutment of said vertical rods with said tie rods.

3. A car truck comprising a spring plank, a truck bolster above said spring plank, a combined balancing and alinement tie rod arranged above and transversely of said truck bolster, a brake beam provided with brake shoes and arranged on each side of the truck bolster, an upright rod on each side of said bolster and secured at its lower end to a brake beam and abutting at its upper end against an outer end of said combined balancing and alinement tie rod and at its lower end against said spring plank, and means for adjusting the distance between the upper ends or points of abutment of said vertical rods with said tie rods.

4. A car truck comprising a spring plank, a truck bolster above said spring plank, a combined balancing and alinement tie rod arranged above and transversely of said truck bolster, a brake beam provided with brake shoes and arranged on each side of the truck bolster, an upright rod on each side of said bolster and detachably secured at its lower end to a brake beam and abutting at its upper end against an outer end of said combined balancing and alinement tie rod, and means for adjusting the distance between the upper ends or points of abutment of said vertical rods with said tie rods.

5. A car truck comprising a spring plank, a truck bolster above said spring plank, a combined balancing and alinement tie rod arranged above and transversely of said truck bolster, a brake beam provided with brake shoes and arranged on each side of the truck bolster, an upright rod on each side of said bolster and secured at its lower end to a brake beam and abutting at its upper end against an outer end of said combined balancing and alinement tie rod, a stop interposed between the lower end of said upright rod and spring plank, and means for adjusting the distance between the upper ends or points of abutment of said vertical rods with said tie rods.

6. A car truck comprising a truck bolster, a combined balancing and alinement tie rod arranged above and transversely of said truck bolster, a brake beam provided with brake shoes and arranged on each side of the truck bolster, an upright rod on each side of said bolster and secured at its lower end to a brake beam and abutting at its upper end against an outer end of said combined balancing and alinement tie rod, whereby said brake beams mutually contribute to support or balance each other through said tie rod.

7. A car truck comprising a truck bolster, a combined balancing and alinement tie rod arranged above and transversely of said truck bolster, a brake beam provided with brake shoes and arranged on each side of the truck bolster, a clamp secured to each brake beam, an upright rod on each side of said bolster and removably secured at its lower end to said clamp and abutting at its upper end against an outer end of said combined balancing and alinement tie rod.

8. A car truck comprising a truck bolster, a balancing and alinement tie rod arranged above and transversely of said truck bolster, a brake beam provided with brake shoes and arranged on a side of the truck bolster, a clamp secured to said brake beam, an upright rod rigidly secured at its lower end to said clamp and abutting at its upper end against an outer end of said balancing and alinement tie rod.

9. A car truck comprising a spring plank, a truck bolster above said spring plank, a combined balancing and alinement tie rod arranged above and transversely of said truck bolster, a brake beam provided with brake shoes and arranged on each side of the truck bolster, an upright rod on each side of said bolster and detachably secured at its lower end to a brake beam and abutting at its upper end against an outer end of said combined balancing and alinement tie rod, a stop secured to the lower end of said upright rod and arranged to abut against said spring plank, and means for adjusting the distance between the upper ends or points of abutment of said vertical rods with said tie rods.

In testimony whereof I affix my signature.

BRODERICK HASKELL.